Figure 1:
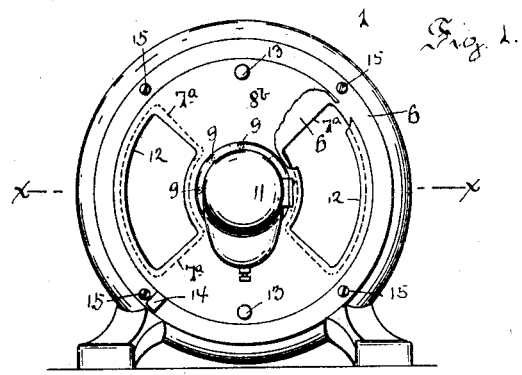

No. 669,577. Patented Mar. 12, 1901.
C. A. ECK.
CASING FOR ELECTRIC MOTORS.
(Application filed Oct. 30, 1900.)

(No Model.)

WITNESSES:

INVENTOR

BY

ATTORNEY

UNITED STATES PATENT OFFICE.

CHARLES A. ECK, OF NEWARK, NEW JERSEY.

CASING FOR ELECTRIC MOTORS.

SPECIFICATION forming part of Letters Patent No. 669,577, dated March 12, 1901.

Application filed October 30, 1900. Serial No. 34,920. (No model.)

*To all whom it may concern:*

Be it known that I, CHARLES A. ECK, a subject of the King of Sweden and Norway, and a resident of Newark, in the county of Essex and State of New Jersey, have invented certain new and useful Improvements in Casings for Electric Motors, of which the following is a specification.

My invention relates generally to electric motors, and more particularly to the casings of same; and the object of the invention is to provide a convenient and inexpensive cover or closure for covering up the delicate parts of the motor when the latter is operated in a place where it is exposed to dust, such as in a factory or when it is used to operate a motor-vehicle, and which at the same time can be opened to give easy access to such parts as need inspection regularly—as, for instance, the brushes.

Other objects will appear farther on in the specification.

To these ends the invention consists of the hereinafter-described combination of coöperative elements.

In the drawings I have embodied the invention in what I consider the best means; but changes may of course be made within the scope of the claims.

Figure 2:
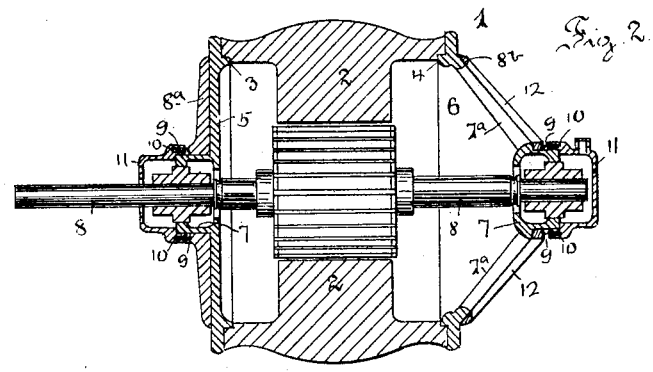
Figure 3:
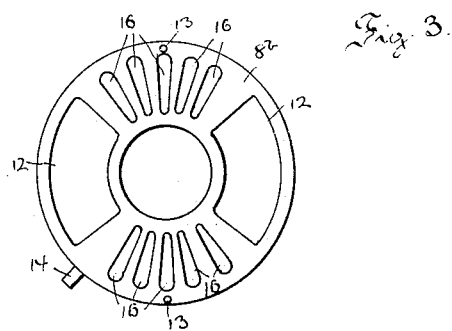

In the said drawings, Figure 1 is an end view of a motor embodying my invention. Fig. 2 is a transverse section on line $x$ $x$ of Fig. 1, showing one end open and the other closed. Fig. 3 is a modification.

Similar numerals of reference indicate corresponding parts in the different views.

I shall describe the casing of an electric motor embodying my invention and afterward point out the novel features in the claims.

1 indicates the casing of a motor of any suitable construction, formed with the pole-pieces 2 and with the open ends 3 and 4. To these open ends are fastened the end pieces 5 and 6, terminating in the bearing portions or bushings 7, adapted to support the armature-shaft 8. These end pieces are stationary and rigid with the casing of the motor and are provided with one or more apertures $7^a$, in this instance radially disposed. The end piece 5 is made straight, while the end piece 6 is made slanting, as shown, to accommodate the armature and the brushes; but other shapes, such as a rounded or semicircular shape, might be used, if desired.

$8^a$ and $8^b$ indicate two movable closing members adapted to rotate or slide on the outside of the bushing 7, where they are mounted loosely and held up tight against the end pieces by means of the springs 9 in the holes 10 of the detachable cap 11. The movable closing member $8^a$ is made of a surface contour similar to the surface contour of the end piece 5, while the movable closing member $8^b$ is made of a surface contour to correspond with the surface contour of the end piece 6; but both are provided with one or more apertures 12, corresponding in size to the apertures $7^a$ of the end pieces. The movable closing members are further provided with one or more knobs 13, adapted to be grasped by the hand when the members are to be manipulated, and with a lug 14, adapted to limit the movement of the movable members by its contact with the stop 15.

From the above it will be understood that when access is desired to the brushes, for instance, or when the motor is kept in a place where it may remain open during the period it operates the movable members are rotated until the apertures 12 register with the apertures $7^a$ of the end pieces, whereby the interior parts are exposed. Conversely, when it is desired to close the motor up the movable members are rotated until the apertures 12 and $7^a$ are brought out of alinement with each other. In this instance the movement of the movable member is shown as being concentric with the stationary member; but it is obvious that in its place may be employed one or more eccentric movements to close the openings of the stationary member so long as the surface contour of the movable closing member conforms to and contacts with the stationary member and the movement of such closing member is parallel to such contour. It will of course also be understood that the movable closing member could be applied to other openings in other parts of the casing with equal effect.

In Fig. 3 is shown a modification consisting in providing one of the two members with the slits 16 to permit a draft of air through the interior of the motor to cool the same.

Having thus described my invention, what I claim is—

1. In an electric motor, the combination with a stationary member of the casing, of a movable closing member having a surface contour corresponding with the surface contour of the said stationary member and having a movement parallel with such contour, one or more apertures in the stationary member and a corresponding number of apertures in the movable member adapted to be brought in and out of alinement with the apertures in the stationary member by the movement of the movable member, substantially as described.

2. In an electric motor, the combination with the casing of same of a detachable but stationary end piece provided with one or more apertures and terminating in a bushing or bearing, and a movable closing member adapted to rotate on the bushing of the end piece and provided with a corresponding number of apertures adapted to be brought in and out of alinement with the apertures on the stationary member by the movement of the movable member, substantially as described.

3. In an electric motor, the combination with the casing of same of a detachable but stationary end piece provided with one or more apertures and terminating in a bushing or bearing, a movable closing member adapted to rotate on the bushing of the end piece and provided with a corresponding number of apertures adapted to be brought in and out of alinement with the apertures on the stationary member by the movement of the movable member, a lug carried by said movable member, a stop on the casing of the motor adapted to coact with the said lug to limit the movement of the movable member, and one or more springs adapted to press the movable member up against the stationary member, substantially as described.

4. In an electric motor, the combination with the casing of same of a detachable but stationary end piece provided with one or more apertures and terminating in a bushing or bearing, a movable closing member adapted to rotate on the bushing of the end piece and provided with a corresponding number of apertures adapted to be brought in and out of alinement with the apertures on the stationary member by the movement of the movable member, a detachable cap on the bushing of the end piece and a plurality of springs located in said bushing and adapted to hold the movable member under pressure up against the stationary member, substantially as described.

5. In an electric motor, the combination with the casing of same of a detachable but stationary end piece provided with one or more apertures and terminating in a bushing or bearing, a movable closing member adapted to rotate on the bushing of the end piece and provided with a corresponding number of apertures adapted to be brought in and out of alinement with the apertures on the stationary member by the movement of the movable member, and a plurality of slits formed in one of said members adapted to admit air to the interior of the motor when the apertures on the movable and stationary members are out of alinement with each other, substantially as described.

Signed at Newark, in the county of Essex and State of New Jersey, this 22d day of Ocber, A. D. 1900.

CHARLES A. ECK.

Witnesses:
FREDERICK T. R. GRUETT,
AXEL V. BEEKEN.